(12) United States Patent
Nakashima et al.

(10) Patent No.: US 7,991,501 B2
(45) Date of Patent: *Aug. 2, 2011

(54) METHOD FOR DETERMINING MACHINING PLANE OF PLANAR MATERIAL, MACHINING METHOD AND DEVICE FOR DETERMINING MACHINING PLANE AND FLAT SURFACE MACHINING DEVICE

(75) Inventors: Koichi Nakashima, Ibaraki (JP); Nobuyoshi Komachi, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 432 days.

This patent is subject to a terminal disclaimer.

(21) Appl. No.: 12/281,847

(22) PCT Filed: Feb. 19, 2007

(86) PCT No.: PCT/JP2007/052970
§ 371 (c)(1),
(2), (4) Date: Sep. 8, 2008

(87) PCT Pub. No.: WO2007/105417
PCT Pub. Date: Sep. 20, 2007

(65) Prior Publication Data
US 2009/0055009 A1    Feb. 26, 2009

(30) Foreign Application Priority Data
Mar. 6, 2006    (JP) ................. 2006-059213

(51) Int. Cl.
G06F 19/00    (2011.01)
G06F 7/66    (2006.01)

(52) U.S. Cl. ........... 700/173; 700/155; 700/129; 700/98

(58) Field of Classification Search .................. 700/173, 700/155, 118, 129
See application file for complete search history.

(56) References Cited

U.S. PATENT DOCUMENTS
6,474,379 B1 * 11/2002 Mellor et al. ............... 144/357
(Continued)

FOREIGN PATENT DOCUMENTS
| JP | 63-173607 A | 7/1988 |
| JP | 01-193172 A | 8/1989 |
| WO | 2006/027885 A1 | 3/2006 |

OTHER PUBLICATIONS
esp@cenet database, One Page English Abstract of JP 06-066549 A, Mar. 8, 1994.
(Continued)

Primary Examiner — Kakali Chaki
Assistant Examiner — Peter Thompson
(74) Attorney, Agent, or Firm — Howson & Howson LLP

(57) ABSTRACT

A surface machining method for obtaining a planar material of a uniform thickness is provided. This method includes mounting a planar material on a surface plate, setting the coordinate axis in the plane direction of the planar material to X, Y, and setting the coordinate axis in the height direction to Z, virtualizing an XY plane including an origin of the Z direction measured as a distance $Z_{(m,n)}$ from the coordinates $(X_m, Y_n)$ of a virtual plane ABCD to the plate thickness center plane S composed of midpoints of segments connecting an upper surface and a lower surface of the planar material, measuring the distance in the Z direction of the plate thickness center plane from the origin in an arbitrary XY plane position, and tilting and cutting the planar material so that the difference between maximum and minimum value of the obtained height data will be minimum.

21 Claims, 3 Drawing Sheets

U.S. PATENT DOCUMENTS 7,277,818 B2 * 10/2007 Sakata et al. .................. 702/154
7,650,201 B2 * 1/2010 Nakashima et al. .......... 700/171
2007/0233312 A1 10/2007 Nakashima et al.

OTHER PUBLICATIONS esp@cenet database, One Page English Abstract of JP 53-069069 A, Jun. 20, 1978.

esp@cenet database, One Page English Abstract of JP 07-128002 A, May 19, 1995.

esp@cenet database, One Page English Abstract of JP 11-201748 A, Jul. 30, 1999.

esp@cenet database, One Page English Abstract of JP 05-223550 A, Aug. 31, 1993.

* cited by examiner

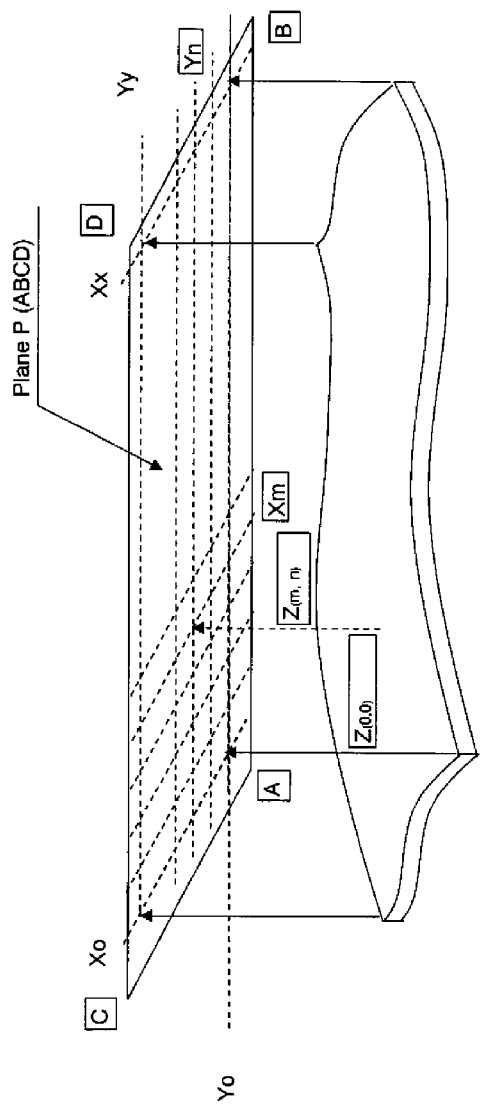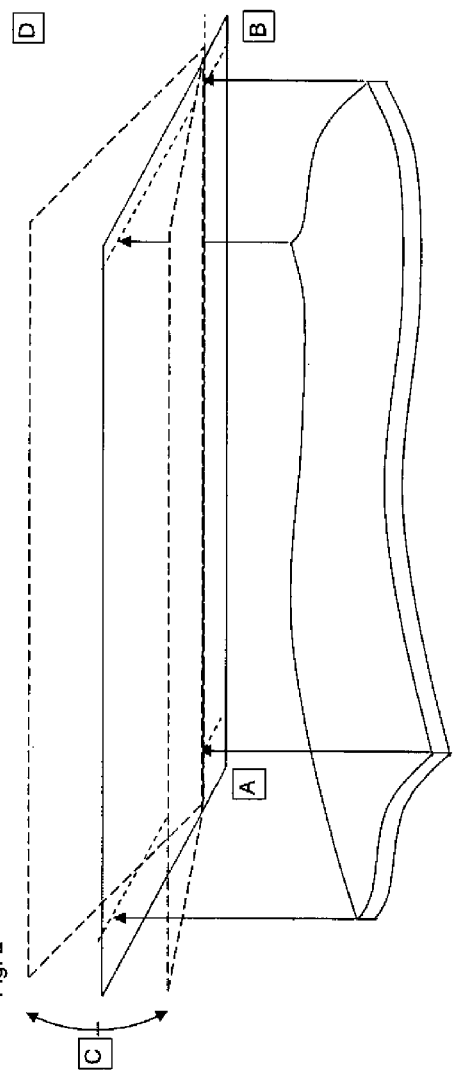

B was increased by 1 unit, C was increased by 1 unit at a time from -max in this state and moved up to +max, and the height h (x, y) at the respective coordinates was measured for each movement of 1 unit.

METHOD FOR DETERMINING MACHINING PLANE OF PLANAR MATERIAL, MACHINING METHOD AND DEVICE FOR DETERMINING MACHINING PLANE AND FLAT SURFACE MACHINING DEVICE

BACKGROUND OF THE INVENTION

The present invention relates to a method for determining a work surface of a planar material in a surface treatment for obtaining a flat plate of a uniform thickness from a planar material, as well as to a machining method of such a work surface, a device for determining the foregoing work surface, and a flattening device.

A ceramic sintered plate such as a sputtering target or a metal plate prepared by metal rolling or forging, in most cases, is subject to be deformed by thermal stress or machining stress during the manufacturing process. Also the thickness is not uniform in some parts. In order to obtain a flat planar material of a uniform thickness from a planar material with such three-dimensional deformation, machining such as cutting, grinding, and electrical discharging is performed.

Conventionally, a material with this kind of deformation was subject to the foregoing processes by an operator setting such material directly on a processing machine, or the operator would roughly measure the deformation of the individual planar materials in advance with a straight end or the like, and insert a spacer during the stage of setting such materials in the processing machine in order to maintain flatness. Nevertheless, the current status is that the foregoing methods are conducted based on the operator's instincts.

For instance, when grinding a material based on the operator's instincts, even if the operator is an expert, he/she will need to perform such grinding more than necessary in order to obtain a plane. This is because it will not be possible to maintain the accuracy of flatness or uniform thickness without excessive grinding by the operator. Therefore, it was necessary to set the machining cost of the material itself higher, and this led to deterioration in the yield. In addition, this inevitably led to increased operation time of the processing machine.

As conventional technology, there are an apparatus to measure precisely the thickness of respective warped planar works (for instance, refer to Patent Document 1), a device to measure a warped planar works comprising a measurement reference unit, a measurement unit, a displacement measurement unit for converting into electrical signals, a warp measure display unit, and a control unit (for instance, refer to Patent Document 2), a manufacturing method of a ceramic product comprising the steps of pressurizing and molding ceramic material powder, irradiating a light beam on the surface thereof, and measuring the surface status upon receiving the reflected light (for instance, refer to Patent Document 3), a size measurement ceramic gauge provided with a stepwise portion (for instance, refer to Patent Document 4), a plate flatness measuring device comprising a downward measuring unit for measuring the flatness, a plate support pin, a vertical motion actuator, and a pressure regulation unit (for instance, refer to Patent Document 5), and a method for measuring the shape irregularity of a ceramic substrate using infrared thermography (for instance, refer to Patent Document 6).

Nevertheless, the foregoing conventional technologies are methods or devices for measuring flatness, measuring displacement or measuring shape irregularities, and do not provide the concept of improving the yield upon performing surface-machining such as cutting, grinding, and electrical discharging.

[Patent Document 1] Japanese Patent Laid-Open Publication No. H6-66549
[Patent Document 2] Japanese Examined Patent Application Publication No. S59-36202
[Patent Document 3] Japanese Patent Laid-Open Publication No. S63-173607
[Patent Document 4] Japanese Patent Laid-Open Publication No. H7-128002
[Patent Document 5] Japanese Patent No. 3418819
[Patent Document 6] Japanese Patent No. 3183935

SUMMARY OF THE INVENTION

As described above, a ceramic sintered plate such as a sputtering target or a metal plate prepared by metal rolling or forging, in most instances, is subject to two- or three-dimensional deformation and/or variation in the plate thickness as a result of thermal stress or machining stress during the manufacturing process. Thus, an object of the present invention is to provide a method and a device for determining a work surface of a planar material in a surface treatment for obtaining a flat planar material of a uniform thickness and minimal machining cost from a planar material with two- or three-dimensional deformation and/or having variation in the plate thickness.

In order to achieve the foregoing object, as a result of intense study, the present inventors discovered that it is possible to obtain a flat planar material of a uniform thickness with a favorable yield, as a first method, by seeking a plane composed from a center point in the thickness direction based on data obtained by measuring the distance (height) from the respective reference planes of the upper and lower surfaces of the planar material, measuring the distance (height) from the reference plane up to the plane composed from the center points by changing the relative positional relation (tilting) of the planar material and the reference plane within a certain definite range, and performing surface treatment by adjusting the tilting of the planar material so that the difference between the maximum and minimum value of the obtained height data becomes minimum.

Based on the foregoing discovery, the present invention provides:

1) A method of determining a work surface of a planar material for cutting a plate of a uniform thickness from a planar material, comprising the steps of setting, with a surface plate of a measuring device as coordinates (X, Y), orthogonal coordinates (X, Y, Z) composed of the coordinates (X, Y) and a Z coordinate perpendicular to the coordinates (X, Y) on the surface plate, and mounting a planar material as an object to be measured on the surface plate; virtually configuring a plane ABCD that is parallel to the XY plane; setting the distance (height) from the coordinates $(X_m, Y_n)$ of the virtual plane ABCD to the plate thickness center plane composed of midpoints of segments connecting an upper and lower surface of the planar material as the object to be measured as $Z_{(m, n)}$, measuring $Z_{(m, n)}$ across the entire area of the planar material to be measured for m distances (heights) in the X direction and n distances (heights) in the Y direction while changing the coordinates (X, Y), and storing the measured data in a storage apparatus of a computer; seeking a maximum and minimum value of $Z_{(m, n)}$ for all coordinate points and calculating the difference thereof, and setting the obtained value as difference H(0.0, 0.0) when the measured value is not manipulated in any way; subsequently fixing end A of the virtual plane ABCD and respectively moving end B and end C vertically at a prescribed deflection width B, C regarding a predetermined maximum deflection width and pitch in the Z-axis direction so as to tilt the virtual plane ABCD against the surface plate on the computer; calculating the distance (height) $Z_{(m, n)}(B, C)$ from all coordinate points $(X_m, Y_n)$ on the virtual plane ABCD to the plate thickness center plane of the coordinate points corresponding to the planar material each time the tilt is changed, and seeking the maximum and minimum value of $Z_{(m, n)}(B, C)$ and calculating the difference $H(B, C)$ thereof; and repeating the calculation for all predetermined B and C combinations, and determining the virtual plane ABCD with the smallest value of $H(B, C)$ calculated in all B and C combinations as a plane that is parallel to a plane of minimum machining cost. This is one of the core inventions of the present application.

As a second method, the present invention provides:

2) A method of determining a work surface of a planar material for cutting a plate of a uniform thickness from a planar material, comprising the steps of setting, with a surface plate of a measuring device as coordinates (X, Y), orthogonal coordinates (X, Y, Z) composed of the coordinates (X, Y) and a Z coordinate perpendicular to the coordinates (X, Y) on the surface plate, and mounting a planar material as an object to be measured on the surface plate; virtually configuring a plane ABCD that is parallel to the XY plane; setting the distances (heights) from the coordinates $(X_m, Y_n)$ of the virtual plane ABCD to an upper surface and a lower surface of the planar material as the object to be measured as $S1_{(m, n)}$, $S2_{(m, n)}$, respectively, measuring $S1_{(m, n)}$, $S2_{(m, n)}$ across the entire area of the planar material to be measured for m distances (heights) in the X direction and n distances (heights) in the Y direction while changing the coordinates (X, Y), and storing the measured data in a storage apparatus of a computer; seeking a maximum and minimum value of $S1_{(m, n)}$ and $S2_{(m, n)}$ for all coordinate points and calculating the difference thereof, and setting the obtained values as difference $H1(0.0, 0.0)$ and difference $H2(0.0, 0.0)$, respectively, when the measured value is not manipulated in any way; subsequently fixing end A of the virtual plane ABCD and respectively moving end B and end C vertically at a prescribed deflection width B, C regarding a predetermined maximum deflection width and pitch in the Z-axis direction so as to tilt the virtual plane ABCD against the surface plate on the computer; calculating the respective distances (heights) $S1_{(m, n)}(B, C)$, $S2_{(m, n)}(B, C)$ from all coordinate points $(X_m, Y_n)$ on the virtual plane ABCD to the upper and lower surface on the planar material of the coordinate points corresponding to the planar material each time the tilt is changed, and seeking the maximum and minimum value of $S1_{(m, n)}(B, C)$ and $S2_{(m, n)}(B, C)$ and calculating the differences $H1(B, C)$ and $H2(B, C)$ thereof; and repeating the calculation for all predetermined B and C combinations, and determining the virtual plane ABCD with the smallest total value of $H1(B, C)$ and $H2(B, C)$ calculated in all B and C combinations as a plane that is parallel to a plane of minimum machining cost. This is another core invention of the present application.

The present invention further provides:

3) The method of determining a work surface of a planar material according to paragraph 1 or paragraph 2, wherein a distance (height) $S1_{(m, n)}$ between a virtual plane ABCD that is parallel to a surface plate positioned at Z=h, which is higher than the upper surface of the planar material, and the upper surface of the planar material and a distance (height) $S2_{(m, n)}$ between a virtual plane ABCD' that is parallel to a surface plate positioned at Z=I, which is lower than the lower surface of the planar material, and the lower surface of the planar material are measured so as to obtain a thickness $T_{(m, n)}$ of the planar material calculated from $T_{(m, n)} = h - I - S1_{(m, n)} - S2_{(m, n)}$. Although this method shows a preferred and specific calculation method for obtaining the thickness $T_{(m, n)}$ of the planar material in the invention described in paragraph 1) or 2) above, this does not preclude the usage of other calculation methods.

The present invention further provides:

4) The method of determining a work surface of a planar material according to anyone of paragraphs 1) to 3) above, wherein, upon reversing the planar material and mounting it on a surface plate of a processing machine, a point on a plane facing the virtual plane ABCD of the planar material corresponding to the coordinate points in which a value $\{Z_{(m, n)} - \frac{1}{2} T_{(m, n)}\}$ obtained by deducting ½ of the thickness $T_{(m, n)}$ of the planar material at the coordinate points $(X_m, Y_n)$ from the distance (height) $Z_{(m, n)}$ up to the planar material among the coordinate points $(X_m, Y_n)$ of the virtual plane ABCD that is parallel to the minimum machining cost determined according to anyone of claims 1 to 3 becomes the smallest value $\{Z_{(m, n)} - \frac{1}{2} T_{(m, n)}\}_{min}$ is set as a point for coming in contact with the surface plate.

This method shows the preferred and specific conditions for reversing planar material and mounting it on a surface plate of a processing machine in the invention described in paragraphs 1) to 3) above. Nevertheless, although this method of setting the planar material on the surface plate can be used as a reference upon deciding the final work surface, it does not preclude the usage of other conditions.

The present invention further provides:

5) The method of determining a work surface of a planar material according to anyone of paragraphs 1) to 4) above, wherein, upon reversing the planar material and mounting it on a surface plate of a processing machine, a value sought by deducting a value $\{Z_{(m, n)} - \frac{1}{2} T_{(m, n)}\}$, which is obtained by subtracting ½ of the thickness $T_{(m, n)}$ of the planar material at the coordinate points $(X_m, Y_n)$ from the distance (height) $Z_{(m, n)}$ up to the planar material among the coordinate points $(X_m, Y_n)$ of the virtual plane ABCD becomes the smallest value $\{Z_{(m, n)} - \frac{1}{2} T_{(m, n)}\}_{min}$, from the measured value of the distance (height) of four corners of a plane facing the virtual plane ABCD of the planar material is set as the thickness of a spacer to be inserted into the four corners upon mounting the planar material on the processing machine.

This method shows a preferred and specific calculation method for setting a spacer in the processing machine in the invention described in paragraphs 1) to 4) above. Although this spacer plays an important role in determining machine cost of the planar material, this does not preclude the usage of other calculation methods.

The present invention further provides:

6) The method of determining a work surface of a planar material according to anyone of paragraphs 1) to 5) above, wherein the distance (height) of the Z direction is measured at positions in intervals of 20 mm or less in both the X direction and Y direction of the coordinate axis of the planar material;

7) The method of determining a work surface of a planar material according to anyone of paragraphs 1) to 6) above, wherein the distance (height) from the planar material is measured with a laser distance sensor or a contact distance sensor; and 8) The method of determining a work surface of a planar material according to anyone of paragraphs 1) to 7) above, wherein the tilt of a biaxial tilt machining table of an NC-controllable processing machine is adjusted in order to set the work surface of the planar material to a prescribed position in relation to the surface plate based on the data. These conditions show preferable and additional conditions.

The present invention further provides:

9) A machining method of determining a work surface of a planar material based on a method according to anyone of paragraphs 1) to 8) above, and, based thereon, performing machining such as cutting, grinding, and electrical discharging in order to cut out a plate of a uniform thickness from a planar material;

10) A machining method of determining a work surface of a planar material based on a method according to anyone of paragraphs 1) to 8) above, and, based thereon, grinding one surface of the planar material, subsequently reversing the planar material and mounting it on a surface plate, and processing the rear surface; and 11) A machining method of fixing a planar material on a surface plate of a processing machine doubling as a measuring device by way of adhesive bonding or electromagnetic adsorption or the like, determining the optimal tilting conditions based on the measurements performed with the method according to anyone of paragraphs 1) to 8) above, subsequently using the biaxial tilt mechanism of the surface plate of the machining so as to tile the surface plate to be parallel to the plane obtained with the optimal tilting conditions, and machining the planar material in such a state without reversing the material. These conditions show preferably and additional conditions.

The present invention further provides:

12) A device of determining a work surface of a planar material for cutting a plate of a uniform thickness from a planar material, comprising a system for setting, with a surface plate of a measuring device as coordinates (X,Y), orthogonal coordinates (X, Y, Z) composed of the coordinates (X, Y) and a Z coordinate perpendicular to the coordinates (X, Y) on the surface plate, mounting a planar material as an object to be measured on the surface plate, and virtually configuring a plane ABCD that is parallel to the XY plane; a system for setting the distance (height) from the coordinates $(X_m, Y_n)$ of the virtual plane ABCD to the plate thickness center plane composed of midpoints of segments connecting an upper surface and a lower surface of the planar material as the object to be measured as $Z_{(m, n)}$, measuring $Z_{(m, n)}$ across the entire area of the planar material to be measured for m distances (heights) in the X direction and n distances (heights) in the Y direction while changing the coordinates (X, Y), and storing the measured data in a storage apparatus of a computer; a system for seeking a maximum and minimum value of $Z_{(m, n)}$ for all coordinate points and calculating the difference thereof, and setting the obtained value as difference H(0.0, 0.0) when the measured value is not manipulated in any way; and a system for subsequently fixing end A of the virtual plane ABCD and respectively moving end B and end C vertically at a prescribed deflection width B, C regarding a predetermined maximum deflection width and pitch in the Z axis direction so as to tilt the virtual plane ABCD against the surface plate on the computer, calculating the distance (height) $Z_{(m, n)}(B, C)$ from all coordinate points $(X_m, Y_n)$ on the virtual plane ABCD to the plate thickness center plane of the coordinate points corresponding to the planar material each time the tilt is changed, and seeking the maximum and minimum value of $Z_{(m, n)}(B, C)$ and calculating the difference H(B, C) thereof, and repeating the calculation for all predetermined B and C combinations. The virtual plane ABCD with the smallest value of H(B, C) calculated in all B and C combinations is determined to be a plane that is parallel to a plane of minimum machining cost. This is one of the core inventions of the present application.

The present invention further provides:

13) A device of determining a work surface of a planar material for cutting a plate of a uniform thickness from a planar material, comprising a system for setting, with a surface plate of a measuring device as coordinates (X,Y), orthogonal coordinates (X, Y, Z) composed of the coordinates (X, Y) and a Z coordinate perpendicular to the coordinates (X, Y) on the surface plate, mounting a planar material as an object to be measured on the surface plate, and virtually configuring a plane ABCD that is parallel to the XY plane; a system for setting the distances (heights) from the coordinates $(X_m, Y_n)$ of the virtual plane ABCD to an upper surface and a lower surface of the planar material as the object to be measured as $S1_{(m, n)}$, $S2_{(m, n)}$, respectively, measuring $S1_{(m, n)}$, $S2_{(m, n)}$ across the entire area of the planar material to be measured for m distances (heights) in the X direction and n distances (heights) in the Y direction while changing the coordinates (X, Y), and storing the measured data in a storage apparatus of a computer; a system for seeking a maximum and minimum value of $S1_{(m,n)}$ and $S2_{(m,n)}$ for all coordinate points and calculating the difference thereof, and setting the obtained values as difference H1(0.0, 0.0) and difference H2(0.0, 0.0), respectively, when the measured value is not manipulated in any way; and a system for subsequently fixing end A of the virtual plane ABCD and respectively moving end B and end C vertically at a prescribed deflection width B, C regarding a predetermined maximum deflection width and pitch in the Z axis direction so as to tilt the virtual plane ABCD against the surface plate on the computer, calculating the respective distances (heights) $S1_{(m, n)}(B, C)$, $S2_{(m, n)}(B, C)$ from all coordinate points $(X_m, Y_n)$ on the virtual plane ABCD to the upper surface and the lower surface on the planar material of the coordinate points corresponding to the planar material each time the tilt is changed, and seeking the maximum and minimum value of $S1_{(m, n)}(B, C)$ and $S2_{(m, n)}(B, C)$ and calculating the differences H1(B, C) and H2(B, C) thereof, and repeating the calculation for all predetermined B and C combinations. The virtual plane ABCD with the smallest total value of H1(B, C) and H2(B, C) calculated in all B and C combinations is determined to be a plane that is parallel to a plane of minimum machining cost. This is another core invention of the present application.

The present invention further provides:

14) The device of determining a work surface of a planar material according to paragraph 12) or paragraph 13) above, wherein a distance (height) $S1_{(m, n)}$ between a virtual plane ABCD that is parallel to a surface plate positioned at Z=h, which is higher than the upper surface of the planar material, and the upper surface of the planar material and a distance (height) $S2_{(m, n)}$ between a virtual plane ABCD' that is parallel to a surface plate positioned at Z=I, which is lower than the lower surface of the planar material, and the lower surface of the planar material are measured so as to obtain a thickness $T_{(m, n)}$ of the planar material calculated from $T_{(m, n)} = h - I - S1_{(m, n)} - S2_{(m, n)}$. This method shows a preferred and specific calculation system for obtaining the thickness $T_{(m, n)}$ of the planar material in the invention described in paragraph 12) or 13) above.

The present invention further provides:

15) The device of determining a work surface of a planar material according to anyone of paragraphs 12) to 14) above, wherein, upon reversing the planar material and mounting it on a surface plate of a processing machine, a point on a plane facing the virtual plane ABCD of the planar material corresponding to the coordinate points in which a value $\{Z_{(m, n)}-\frac{1}{2} T_{(m, n)}\}$ obtained by deducting ½ of the thickness $T_{(m, n)}$ of the planar material at the coordinate points $(X_m, Y_n)$ from the distance (height) $Z_{(m, n)}$ up to the planar material among the coordinate points $(X_m, Y_n)$ of the virtual plane ABCD that is parallel to the minimum machining cost determined according to anyone of claims 1 to 3 becomes the smallest value $\{Z_{(m, n)}-\frac{1}{2} T_{(m, n)}\}_{min}$ is set as a point for coming in contact with the surface plate. Although this method of setting the planar material on the surface plate can be used as a reference upon deciding the final work surface, it does not preclude the usage of other conditions.

The present invention further provides:

16) The device of determining a work surface of a planar material according to anyone of paragraphs 12) to 15) above, wherein, upon reversing the planar material and mounting it on a surface plate of a processing machine, a value sought by deducting a value $\{Z_{(m, n)}-\frac{1}{2} T_{(m, n)}\}$, which is obtained by subtracting ½ of the thickness $T_{(m, n)}$ of the planar material at the coordinate points $(X_m, Y_n)$ from the distance (height) $Z_{(m, n)}$ up to the planar material among the coordinate points $(X_m, Y_n)$ of the virtual plane ABCD becomes the smallest value $\{Z_{(m, n)}-\frac{1}{2} T_{(m, n)}\}_{min}$, from the measured value of the distance (height) of four corners of a plane facing the virtual plane ABCD of the planar material is set as the thickness of a spacer to be inserted into the four corners upon mounting the planar material on the processing machine. Although this spacer is a system that plays an important role in determining the machining cost of the planar material, this does not preclude the usage of other system.

The present invention further provides:

17) The device of determining a work surface of a planar material according to anyone of paragraphs 12) to 16) above, further comprising machining equipment for performing cutting work, grinding process, and electrical discharging in order to cut out a plate having a uniform thickness from a planar material;

18) The device of determining a work surface of a planar material according to anyone of paragraphs 12) to 17) above, further comprising a device for grinding one surface of the planar material, subsequently reversing the planar material and mounting it on a surface plate, and processing the rear surface; and 19) The device of determining a work surface of a planar material according to anyone of paragraphs 12) to 18) above, further comprising a device for measuring the distance (height) of the Z direction at positions in intervals of 20 mm or less in both the X direction and Y direction of the coordinate axis of the planar material. These conditions show preferable and additional conditions.

The present invention further provides:

20) The device of determining a work surface of a planar material according to anyone of paragraphs 12) to 19) above, further comprising a device for measuring the distance (height) from the planar material with a laser distance sensor or a contact distance sensor;

21) The device of determining a work surface of a planar material according to anyone of paragraphs 12) to 20) above, further comprising a device for adjusting the tilt of a biaxial tilt machining table of an NC-controllable processing machine in order to set the work surface of the planar material to a prescribed position in relation to the surface plate based on the data; and 22) A flattening device such as a grinding machine, a milling machine, an electrical discharging machine or the like comprising the device according to anyone of paragraphs 12) to 21) above. These conditions show preferable and additional conditions.

As described above, the present invention yields a superior effect in that it is able to obtain a flat planar material of a uniform thickness from a planar material with complex two- or three-dimensional deformation by performing surface-machining such as cutting, grinding, and electrical discharging at minimal machining cost.

In other words, more specifically, when manufacturing a product with a predetermined thickness, it is possible to reduce the margin in the unprocessed thickness of the material, whereby the machining cost can be set lower than conventional methods, yield can be improved, and machining time can be saved.

Further, when manufacturing a material without any designated thickness from a deformed material via machining, it is possible to thicken the thickness of products of conventional art.

In addition, no more trial and error will be required in setting a material on a processing machine table, and machining at a minimum machining cost can be easily performed even when the operator is not an expert.

As described above, the present invention yields significant effects.

BRIEF DESCRIPTION OF THE DRAWINGS

FIG. 1 is an explanatory diagram in a case of measuring the height $Z_{(m, n)}$ up to an arbitrary plane position $(X_m, Y_n)$ of a material S with the position of a sensor of a measuring device as the origin of the height direction;

FIG. 2 is an explanatory diagram in a case of virtually configuring a plane (ABCD) that is the same size as the material S in a computer, fixing an end A of the plane ABCD, and moving only an end C to a prescribed height;

DETAILED DESCRIPTION OF THE INVENTION

The present invention is now explained in detail with reference to the attached drawings as necessary. The following explanation, however, is merely for explaining the present invention in an easy-to-understand manner, and the invention is not limited to this explanation. In other words, any modifications, other structures or configurations based on the present invention are covered by the invention as a matter of course.

Although there is a difference in measuring the distance (height) from the coordinates ($X_m$, $Y_n$) of the virtual plane ABCD to the plate thickness center plane composed of midpoints of segments connecting the upper surface and the lower surface of the planar material as an object to be measured, and measuring the distance (height) from the coordinates ($X_m$, $Y_n$) or coordinates ($X'_m$, $Y'_n$) of the virtual plane ABCD or virtual plane ABCD' to the upper surface and the lower surface of the planar material as the object to be measured, the other operations are substantially the same. This is now explained with reference to FIG. 1 to FIG. 4.

A planar material with complex two- or three-dimensional deformation such as a ceramic sintered plate or a metal plate prepared by metal rolling or forging is immovably placed on a lattice-like surface plate having a certain degree of flatness and a prescribed pitch. The coordinate axis in the plane direction of this material is set as X, Y, the coordinate axis in the height direction in the top surface direction of the planar material is set as Z, and the coordinate axis in the height direction in the bottom surface direction of the planar material is set as Z'.

A measuring device such as a laser distance measuring device capable of retaining a certain degree of height from the surface plate and moving in parallel to the XY direction of the surface plate is mounted above and below the surface plate. A plane parallel to the surface plate in which the Z axis and Z' axis origin of the sensor moves is set as plane P, P'.

As shown in FIG. 1, the sensor position of the measuring device is made to be the origin of the height direction for measuring the height (S1), (S2) up to an arbitrary plane position (X, Y) of the material. It is necessary to change the X, Y coordinate points of measurement depending on the deformation of the product, and, for instance, the X direction and the Y direction are both made to be a pitch of 20 mm.

Figure 4:
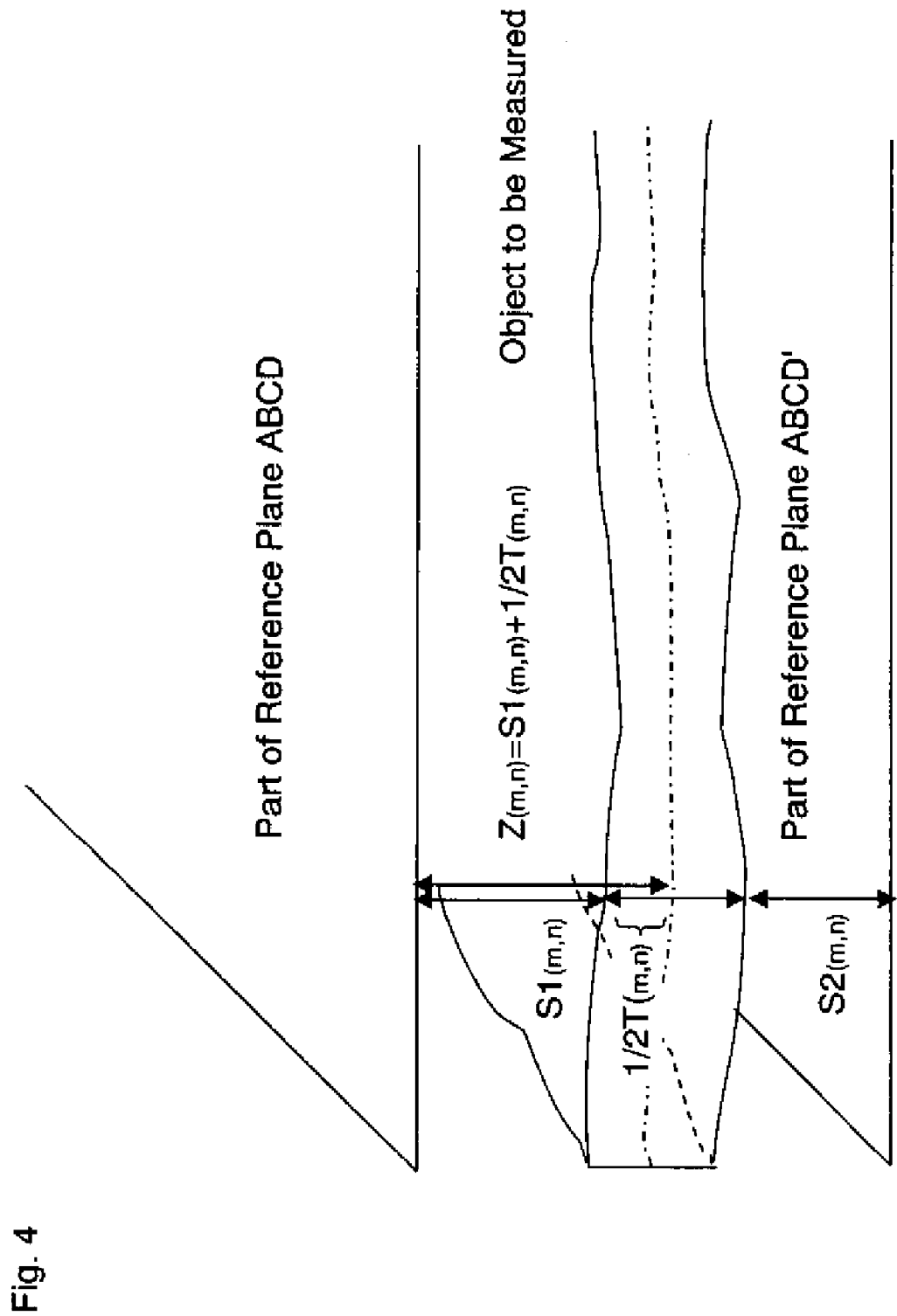
FIG. 4 is an explanatory diagram of a work surface determination system for determining the minimum work surface by measuring the distance (height) from the coordinates $(X_m, Y_n)$ of the virtual plane ABCD to the plate thickness center plane composed of midpoints of segments connecting the upper surface and the lower surface of the planar material as an object to be measured, or by measuring the distance (height) from the coordinates $(X_m, Y_n)$ or coordinates $(X'_m, Y'_n)$ of the virtual plane ABCD or virtual plane ABCD' to the upper surface and the lower surface of the planar material as the object to be measured.

Upon determining the work surface for cutting out a plate having a uniform thickness from a planar material, for instance, as shown in FIG. 4, foremost, with a surface plate of a measuring device as coordinates (X, Y), orthogonal coordinates (X, Y, Z) composed of the coordinates (X, Y) and a Z coordinate perpendicular to the coordinates (X, Y) are set on the surface plate, and a planar material as an object to be measured is mounted on the surface plate.

Subsequently, a plane ABCD that is parallel to the XY plane is virtually configured, and the distance (height) from the coordinates ($X_m$, $Y_n$) of the virtual plane ABCD to the plate thickness center plane composed of midpoints of segments connecting an upper surface and a lower surface of the planar material as the object to be measured is set as $Z_{(m, n)}$.

$Z_{(m, n)}$ is measured across the entire area of the planar material to be measured for m distances (heights) in the X direction and n distances (heights) in the Y direction while changing the coordinates (X, Y), and the measured data is stored in a storage apparatus of a computer.

A maximum and minimum value of $Z_{(m, n)}$ for all coordinate points are sought and the difference thereof is calculated, and the obtained value is set as difference H(0.0, 0.0) when the measured value is not manipulated in any way.

Subsequently, end A of the virtual plane ABCD is fixed and end B and end C are respectively moved vertically at a prescribed deflection width B, C regarding a predetermined maximum deflection width and pitch in the Z-axis direction so as to tilt the virtual plane ABCD against the surface plate on the computer. The distance (height) $Z_{(m, n)}$(B, C) from all coordinate points ($X_m$, $Y_n$) on the virtual plane ABCD to the plate thickness center plane of the coordinate points corresponding to the planar material is calculated each time the tilt is changed, and the maximum and minimum value of $Z_{(m, n)}$(B, C) are sought and the difference H(B, C) thereof is calculated.

The calculation for all predetermined B and C combinations is repeated, and the virtual plane ABCD with the smallest value of H(B, C) calculated in all B and C combinations is determined to be a plane that is parallel to a plane of minimum machining cost.

The following method may also be adopted upon cutting out a plate having a uniform thickness from a planar material. In other words, as shown in FIG. 4, with a surface plate of a measuring device as coordinates (X, Y), orthogonal coordinates (X, Y, Z) composed of the coordinates (X, Y) and a Z coordinate perpendicular to the coordinates (X, Y) are set on the surface plate, and a planar material as an object to be measured is mounted on the surface plate.

Subsequently, a plane ABCD that is parallel to the XY plane is virtually configured, and the distances (heights) from the coordinates ($X_m$, $Y_n$) of the virtual plane ABCD to an upper surface and a lower surface of the planar material as the object to be measured are set as $S1_{(m, n)}$, $S2_{(m, n)}$, respectively.

$S1_{(m, n)}$, $S2_{(m, n)}$ are measured across the entire area of the planar material to be measured for m distances (heights) in the X direction and n distances (heights) in the Y direction while changing the coordinates (X, Y), and the measured data is stored in a storage apparatus of a computer.

A maximum and minimum value of $S1_{(m, n)}$ and $S2_{(m, n)}$ for all coordinate points are sought and the difference thereof is calculated, and the obtained values are set as difference H1(0.0, 0.0) and difference H2(0.0, 0.0), respectively, when the measured value is not manipulated in any way.

Subsequently, end A of the virtual plane ABCD is fixed and end B and end C are respectively moved vertically at a prescribed deflection width B, C regarding a predetermined maximum deflection width and pitch in the Z-axis direction so as to tilt the virtual plane ABCD against the surface plate on the computer. The respective distances (heights) $S1_{(m, n)}$(B, C), $S2_{(m, n)}$(B, C) from all coordinate points ($X_m$, $Y_n$) on the virtual plane ABCD to the upper surface and the lower surface on the planar material of the coordinate points corresponding to the planar material are calculated each time the tilt is changed, and the maximum and minimum value of $S1_{(m, n)}$(B, C) and $S2_{(m, n)}$(B, C) are sought and the differences H1(B, C) and H2(B, C) thereof are calculated.

The calculation is repeated for all predetermined B and C combinations, and the virtual plane ABCD with the smallest total value of H1(B, C) and H2(B, C) calculated in all B and C combinations is determined to be a plane that is parallel to a plane of minimum machining cost.

As the method for measuring the height, an appropriate method such as using a laser distance sensor or a contact distance sensor may be employed. The term height (Z coordinate) as used herein refers to the distance of the perpendicular line from the coordinates (X, Y) of plane P on which the sensor of the measuring device moves to the point in reaching the material S surface.

The positioning accuracy of the X, Y coordinates and the measurement accuracy of the Z coordinate are determined by the degree of demanding the reduction in machining cost of the material S. For example, with an expensive material such as a noble metal, it is effective to improve the measurement accuracy of the apparatus to seek the improvement in the yield upon cutting a product plate from the material. Nevertheless, the accuracy can be low when using an inexpensive material such as steel.

Further, when much machining time is required such as in machining ceramics, it is effective to improve the accuracy of the apparatus and reduce the machining cost and save the machining time. Nevertheless, the measurement accuracy can be low when using a metal material with favorable machinability in which the machining time will not be a problem.

According to the size of the material, all heights $Z_{(0, 0)}$ to $Z_{(x, y)}$ from $(X_0, Y_0)$ to $(X_x, Y_y$: final coordinates) are measured. The result of all measurements can be temporarily stored in a recording device of a computer in a format such as a tabular form so data can be organized easily.

Foremost, the origin in the Z direction of the measuring device; that is, the plane S of the height H is virtualized. It can be said that the height of the respective measurement points is the height from the virtual surface.

The difference of the maximum value ($Z_{max}$) and the minimum value ($Z_{min}$) of the height data is the current machining cost. This is because, if the material S is set on the processing machine table in the current status, the cutting tool of the processing machine will start to come in contact from the minimum point ($Z_{min}$) of the height, and the material S will become flat when such cutting tool reaches the maximum point ($Z_{max}$) together with the advancement of machining.

Therefore, in order to enable the machining of the material at minimal machining cost, the material S should be tilted so that the absolute value of the difference between the heights ($Z_{min}$) and ($Z_{max}$) becomes minimal.

Nevertheless, since a material is deformed to begin with, it is somewhat complicated to calculate changes in the height when tilting the material. Thus, instead of tilting the material S, the height can be recalculated by tilting the plane P.

Although there are numerous methods of tilting the plane P with a computer, the following method has been adopted since it is based on actual measurement, calculation is easy, and the calculation result can be directly reflected on the thickness of a spacer. A plane (ABCD) on the plane P and of the same size as the material S is virtually configured in the computer. Here, the height $Z_{(m, n)}$ from the coordinates $(X_m, Y_n)$ in the plane ABCD to the coordinates $(X_m, Y_n)$ of the material is the first measured height.

To represent the height of the coordinate $S1_{(m, n)}$ of the plane ABCD, $Z_{(m, n)}/(0.0, 0.0)$ is used. Also, 0.0, 0.0 shows that the measured value has not been manipulated in any way; that is, it shows that the plane (ABCD) is not tilted.

The maximum value $Z_{(m, n)}(0.0, 0.0)$ max and the minimum value $Z_{(m, n)}(0.0, 0.0)$ min of $Z_{(m, n)}(0.0, 0.0)$ regarding all measured coordinate points are searched, and the difference H(0.0, 0.0) is calculated with the following equation.

$$H(0.0, 0.0) = Z_{(m, n)}(0.0, 0.0)_{max} - Z_{(m, n)}(0.0, 0.0)_{min}$$

Figure 3:
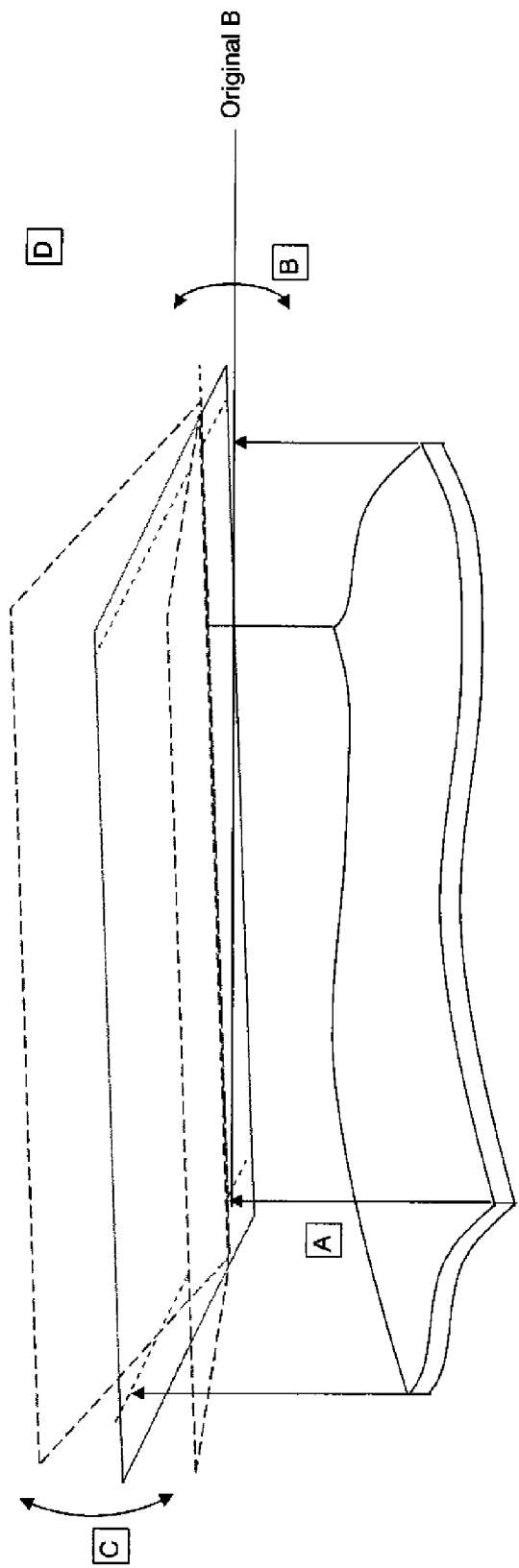
FIG. 3 is an explanatory diagram in a case of virtually configuring a plane (ABCD) that is the same size as the material S in a computer, fixing an end A of the plane ABCD, and moving ends B and C to a prescribed height.

Subsequently, as shown in FIG. 2 and FIG. 3, end A of the plane ABCD is fixed, and ends B, C are sequentially raised and lowered (for instance, ±3.0 mm) in a prescribed height (for example, 0.1 mm pitch) within a prescribed range in the Z axis direction. FIG. 2 illustrates a case of fixing end A of the plane ABCD and moving only end C to a prescribed height, and FIG. 3 depicts a case of fixing end A of the plane ABCD and moving ends B, C to a prescribed height.

End D is automatically decided when ABC are determined. For instance, foremost, when B is set to −3.0 mm and C is set to −3.0 mm, the distance from the respective coordinates of the plane ABCD to the corresponding coordinate point of the material is calculated, and the new height $Z_{(m, n)}$ is set to (−3.0, −3.0). The value (−3.0, −3.0) represents that point B is lowered 3.0 mm from the origin, and point C is lowered 3.0 mm from the origin.

This operation is performed to all measurement points, the maximum value $Z_{(m, n)}(-3.0, -3.0)$ max and the minimum value $Z_{(m, n)}(-3.0, -3.0)$ min of $Z_{(m, n)}(-3.0, -3.0)$ are searched, and the difference H(−3.0, −3.0) is calculated based on the following equation.

$$H(-3.0, -3.0) = Z_{(m, n)}(-3.0, -3.0)_{max} - Z_{(m, n)}(-3.0, -3.0)_{min}$$

Subsequently, C is set to −2.9 mm, and the same operation is repeated to seek H(−3.0, −2.9). Similarly, C is increased 0.1 mm at a time, and all corresponding heights H(−3.0, C) (C=−2.9, H −2.8, H −2.7 . . . H 0 . . . H +3.0) are sought.

After this operation is complete, B is set to −2.9, and the same operation is repeated while increasing C to −3.0 to +3.0 to seek all heights H(−2.9, C). Further, B is set to −2.8, −2.7, −2.6 . . . 0 . . . +3.0, and all corresponding heights H(B, C) are sought. In this example, there are 60 ways for B and 60 ways for C, so there are 60×60=3,600 ways for H(B, C).

Among such 3,600 ways, the H(B, C) showing the smallest value among the heights H; that is, the combination of H(B, C) min will be the plane that is parallel to the plane of the minimum machining cost for machining the material.

With the distance from the plane ABCD to the material surface, since the coordinates are out of alignment due to the tilting of the plane, correcting such misalignment is necessary in the amount of the angle to ensure accuracy. Nevertheless, this can be ignored in terms of execution since the amount of tilting against the length of the material is small.

Subsequently, among the measurement points of the H(B, C) min, the measurement point in which the height Z from the plane ABCD to the material is the smallest value; namely, $Z_{min}/H(B, C)_{min}$, is searched. When actually engaging in machining, since the material is reversed upside down and set on the surface plate of the processing machine, this is the only point that comes in contact with the surface plate. However, when there are a plurality of points to become $Z_{min}/H(B, C)_{min}$, all points will come in contact with the surface plate.

Thereafter, $Z_{min}/H(B, C)_{min}$ is subtracted from the heights $Z(X_0, Y_0), Z(X_x, Y_0), Z(X_0, Y_y), Z(X_x, Y_y)$ in the H(B, C) min of the measurement point of the four corners of the material. The value obtained thereby will become the thickness of a spacer to be inserted below the four corners upon setting the material on the processing machine.

In a practical sense, since the sensor is positioned at the upper part, the material is reversed upside down when being mounted on the processing machine. Thereupon, when the thickness of the material varies depending on the location, the height of the spacer determined with the foregoing method may not necessarily realize an optimal surface. However, when it is possible to ignore variations in the thickness of the material as in this example, it is not necessary to correct such variations.

When variations in the thickness of the material become a problem, the practical optimal surface can be easily determined by measuring the thickness of the four corners in advance, calculating the average value Ave. $(X_0Y_0, X_ZY_0)$, $Z(X_0, Y_Z), Z(X_Z, Y_Z)$, and adding or subtracting the difference between the average value and the thickness of the respective corners to or from the spacer height.

The material is reversed upside down from the time of measurement and fixed to the table of a flattening machine such as a grinding machine or a front milling machine in a state with spacers laid under the prescribed four corners. If machining is performed in this state, it is possible to obtain a plane without any uncut portions at minimal machining cost.

Further, by providing to the processing machine an apparatus that is XY biaxially movable and capable of setting the tilting of the plane with such movement, and providing a tilting that realizes a surface where the optimal surface calculated with this apparatus is symmetrical to the Z axis direction in the XY plane, it is possible to realize an optimal surface without a spacer. However, in the foregoing case, it is desirable to insert a spacer for correcting the difference in heights at the four corners of the material when the plane ABCD is horizontal; that is, in the state of the initial measurement in order to prevent the material from moving.

The height of this spacer is equivalent to a value obtained by subtracting the height of a measurement point of a location with the lowest height from the height from the plane ABCD during the initial measurement up to the measurement point of the four corners.

In addition to virtualizing the surface containing the original of the Z direction measured with a computer, the absolute value of the difference between the maximum value $Z_{max}$ and the minimum value $Z_{min}$ of the height data is sought.

The height of the virtual plane can be calculated based on the following equation. However, displacement in the X, Y direction as a result of tilting the sintered body can be ignored in view of the size of the work, and the Z coordinate axis of the grid point of the virtual plane can be sought with the following equation.

$$Z = Z1/(n-1) \times i + Z2/(m-1) \times j$$

Provided that n is the number of measurement points in the X direction, m is the number of measurement points in the Y direction, and i, j respectively show the measurement order from point 0.

Thereby, it is possible to tilt the planar material on the computer, insert a spacer between the surface plate and the planar material based on the foregoing data, and adjust the tilting of the planar material. It is also possible to adjust the tilt of a biaxial tilt machining table of an NC-controllable processing machine based on the data.

Like this, it is possible to obtain a product by surface-machining such as cutting, grinding, and electrical discharging from a planar material with complex two- or three-dimensional deformation, at minimal machining cost. It is also possible to grind one surface of the planar material, subsequently reverse the planar material and mount it on a surface plate, and machine the rear surface.

The surface machining method of a planar material according to the present invention yields a superior effect in that it enable us to obtain a flat planar material of a uniform thickness from a planar material with complex two or three-dimensional deformation by performing surface machining such as cutting, grinding, and electrical discharging at minimal machining cost.

In other words, specifically, when manufacturing a product with a predetermined thickness, it is possible to reduce the margin in the unprocessed thickness of the material, whereby the machining cost can be set lower than conventional methods, yield can be improved, and machining time can be saved.

Further, when manufacturing a material without any designated thickness from a deformed material by machining, it is possible to thicken the thickness of products compared with that of conventional art.

In addition, no more trial and error will be required in setting a material on a processing machine table, and machining at a minimum machining cost can be easily performed even when the operator is not an expert.

As described above, since the present invention is able to obtain a flat planar material of a uniform thickness by performing surface machining such as cutting, grinding, and electrical discharging at minimal machining cost, it is suitable for the manufacture of a relatively expensive sputtering target or the like.

The invention claimed is:

1. A method of determining a work surface of a planar material for cutting a plate of a uniform thickness from a planar material, comprising the steps of:

setting, with a surface plate of a measuring device as coordinates (X, Y), orthogonal coordinates (X, Y, Z) composed of the coordinates (X, Y) and a Z coordinate perpendicular to the coordinates (X, Y) on the surface plate, and mounting a planar material as an object to be measured on the surface plate;

virtually configuring a plane ABCD that is parallel to the XY plane;

setting the distance or height from the coordinates $(X_m, Y_n)$ of the virtual plane ABCD to the plate thickness center plane composed of midpoints of segments connecting an upper and lower surface of the planar material as the object to be measured as $Z_{(m, n)}$, measuring $Z_{(m, n)}$ across the entire area of the planar material to be measured for m distances or heights in the X direction and n distances or heights in the Y direction while changing the coordinates (X, Y), and storing the measured data in a storage apparatus of a computer;

seeking a maximum and minimum value of $Z_{(m, n)}$ for all coordinate points and calculating the difference thereof, and setting the obtained value as difference H(0.0, 0.0) when the measured value is not manipulated in any way;

subsequently fixing end A of the virtual plane ABCD and respectively moving end B and end C vertically at a prescribed deflection width B, C regarding a predetermined maximum deflection width and pitch in the Z-axis direction so as to tilt the virtual plane ABCD against the surface plate on the computer;

calculating the distance or height $Z_{(m, n)}(B, C)$ from all coordinate points $(X_m, Y_n)$ on the virtual plane ABCD to the plate thickness center plane of the coordinate points corresponding to the planar material each time the tilt is changed, and seeking the maximum and minimum value of $Z_{(m, n)}(B, C)$ and calculating the difference H(B, C) thereof; and repeating the calculation for all predetermined B and C combinations, and determining the virtual plane ABCD with the smallest value of H(B, C) calculated in all B and C combinations as a plane that is parallel to a plane of minimum machining cost.

2. A method of determining a work surface of a planar material for cutting a plate of a uniform thickness from a planar material, comprising the steps of:

setting, with a surface plate of a measuring device as coordinates (X, Y), orthogonal coordinates (X, Y, Z) composed of the coordinates (X, Y) and a Z coordinate perpendicular to the coordinates (X, Y) on the surface plate, and mounting a planar material as an object to be measured on the surface plate;

virtually configuring a plane ABCD that is parallel to the XY plane;

setting the distances or heights from the coordinates $(X_m, Y_n)$ of the virtual plane ABCD to an upper surface and a lower surface of the planar material as the object to be measured as $S1_{(m, n)}$, $S2_{(m, n)}$, respectively, measuring $S1_{(m, n)}$, $S2_{(m, n)}$ across the entire area of the planar material to be measured for m distances or heights in the X direction and n distances or heights in the Y direction while changing the coordinates (X, Y), and storing the measured data in a storage apparatus of a computer;

seeking a maximum and minimum value of $S1_{(m, n)}$ and $S2_{(m, n)}$ for all coordinate points and calculating the difference thereof, and setting the obtained values as difference $H1(0.0, 0.0)$ and difference $H2(0.0, 0.0)$, respectively, when the measured value is not manipulated in any way;

subsequently fixing end A of the virtual plane ABCD and respectively moving end B and end C vertically at a prescribed deflection width B, C regarding a predetermined maximum deflection width and pitch in the Z-axis direction so as to tilt the virtual plane ABCD against the surface plate on the computer;

calculating the respective distances or heights $S1_{(m, n)}(B, C)$, $S2_{(m, n)}(B, C)$ from all coordinate points $(X_m, Y_n)$ on the virtual plane ABCD to the upper and lower surface on the planar material of the coordinate points corresponding to the planar material each time the tilt is changed, and seeking the maximum and minimum value of $S1_{(m, n)}(B, C)$ and $S2_{(m, n)}(B, C)$ and calculating the differences $H1(B, C)$ and $H2(B, C)$ thereof; and repeating the calculation for all predetermined B and C combinations, and determining the virtual plane ABCD with the smallest total value of $H1(B, C)$ and $H2(B, C)$ calculated in all B and C combinations as a plane that is parallel to a plane of minimum machining cost.

3. The method of determining a work surface of a planar material according to claim 2, wherein a distance or height $S1_{(m, n)}$ between a virtual plane ABCD that is parallel to a surface plate positioned at Z=h, which is higher than the upper surface of the planar material, and the upper surface of the planar material and a distance or height $S2_{(m, n)}$ between a virtual plane ABCD' that is parallel to a surface plate positioned at Z=I, which is lower than the lower surface of the planar material, and the lower surface of the planar material are measured so as to obtain a thickness $T_{(m, n)}$ of the planar material calculated from $T_{(m, n)} = h - I - S1_{(m, n)} - S2_{(m, n)}$.

4. The method of determining a work surface of a planar material according to claim 1, wherein, upon reversing the planar material and mounting it on a surface plate of a processing machine, a point on a plane facing the virtual plane ABCD of the planar material corresponding to the coordinate points in which a value $\{Z_{(m, n)} - \frac{1}{2} T_{(m, n)}\}$ obtained by deducting ½ of the thickness $T_{(m, n)}$ of the planar material at the coordinate points $(X_m, Y_n)$ from the distance or height $Z_{(m, n)}$ up to the planar material among the coordinate points $(X_m, Y_n)$ of the virtual plane ABCD that is parallel to the minimum machining cost becomes the smallest value $\{Z_{(m, n)} - \frac{1}{2} T_{(m, n)}\}_{min}$ is set as a point for coming in contact with the surface plate.

5. The method of determining a work surface of a planar material according to claim 1, wherein, upon reversing the planar material and mounting it on a surface plate of a processing machine, a value sought by deducting a value $\{Z_{(m, n)} - \frac{1}{2} T_{(m, n)}\}$, which is obtained by subtracting ½ of the thickness $T_{(m, n)}$ of the planar material at the coordinate points $(X_m, Y_n)$ from the distance or height $Z_{(m, n)}$ up to the planar material among the coordinate points $(X_m, Y_n)$ of the virtual plane ABCD becomes the smallest value $\{Z_{(m, n)} - \frac{1}{2} T_{(m, n)}\}_{min}$, from the measured value of the distance or height of four corners of a plane facing the virtual plane ABCD of the planar material is set as the thickness of a spacer to be inserted into the four corners upon mounting the planar material on the processing machine.

6. The method of determining a work surface of a planar material according to claim 1, wherein the distance or height of the Z direction is measured at positions in intervals of 20 mm or less in both the X direction and Y direction of the coordinate axis of the planar material.

7. The method of determining a work surface of a planar material according to claim 1, wherein the distance or height from the planar material is measured with a laser distance sensor or a contact distance sensor.

8. The method of determining a work surface of a planar material according to claim 1, wherein the tilt of a biaxial tilt machining table of an NC-controllable processing machine is adjusted in order to set the work surface of the planar material to a prescribed position in relation to the surface plate based on the data.

9. A machining method of determining a work surface of a planar material based on a method according to claim 1, and, based thereon, performing machining to cut out a plate of a uniform thickness from a planar material.

10. A machining method of determining a work surface of a planar material based on a method according to claim 1, and, based thereon, grinding one surface of the planar material, subsequently reversing the planar material and mounting it on a surface plate, and processing the rear surface.

11. A machining method of fixing a planar material on a surface plate of a processing machine doubling as a measuring device by way of adhesive bonding or electromagnetic adsorption, determining the optimal tilting conditions based on the measurements performed with the method according to claim 1, subsequently using a biaxial tilt mechanism of the surface plate of the machining so as to tilt the surface plate to be parallel to the plane obtained with the optimal tilting conditions without reversing the material, and processing the planar material in such a state.

12. A device of determining a work surface of a planar material for cutting a plate of a uniform thickness from a planar material, comprising:

a system for setting, with a surface plate of a measuring device as coordinates (X, Y), orthogonal coordinates (X, Y, Z) composed of the coordinates (X, Y) and a Z coordinate perpendicular to the coordinates (X, Y) on the surface plate, mounting a planar material as an object to be measured on the surface plate, and virtually configuring a plane ABCD that is parallel to the XY plane;

a system for setting the distance or height from the coordinates $(X_m, Y_n)$ of the virtual plane ABCD to the plate thickness center plane composed of midpoints of segments connecting an upper surface and a lower surface of the planar material as the object to be measured as $Z_{(m, n)}$, measuring $Z_{(m, n)}$ across the entire area of the planar material to be measured for m distances or heights in the X direction and n distances or heights in the Y direction while changing the coordinates (X, Y), and storing the measured data in a storage apparatus of a computer;

a system for seeking a maximum and minimum value of $Z_{(m, n)}$ for all coordinate points and calculating the difference thereof, and setting the obtained value as difference $H(0.0, 0.0)$ when the measured value is not manipulated in any way; and a system for subsequently fixing end A of the virtual plane ABCD and respectively moving end B and end C vertically at a prescribed deflection width B, C regarding a predetermined maximum deflection width and pitch in the Z axis direction so as to tilt the virtual plane ABCD against the surface plate on the computer, calculating the distance or height $Z_{(m, n)}(B, C)$ from all coordinate points $(X_m, Y_n)$ on the virtual plane ABCD to the plate thickness center plane of the coordinate points corresponding to the planar material each time the tilt is changed, and seeking the maximum and minimum value of $Z_{(m, n)}$(B, C) and calculating the difference H(B, C) thereof, and repeating the calculation for all predetermined B and C combinations;

wherein the virtual plane ABCD with the smallest value of H(B, C) calculated in all B and C combinations is determined to be a plane that is parallel to a plane of minimum machining cost.

13. A device of determining a work surface of a planar material for cutting a plate of a uniform thickness from a planar material, comprising:

a system for setting, with a surface plate of a measuring device as coordinates (X, Y), orthogonal coordinates (X, Y, Z) composed of the coordinates (X, Y) and a Z coordinate perpendicular to the coordinates (X, Y) on the surface plate, mounting a planar material as an object to be measured on the surface plate, and virtually configuring a plane ABCD that is parallel to the XY plane;

a system for setting the distances or heights from the coordinates $(X_m, Y_n)$ of the virtual plane ABCD to an upper surface and a lower surface of the planar material as the object to be measured as $S1_{(m, n)}$, $S2_{(m, n)}$, respectively, measuring $S1_{(m, n)}$, $S2_{(m, n)}$ across the entire area of the planar material to be measured for m distances or heights in the X direction and n distances or heights in the Y direction while changing the coordinates (X, Y), and storing the measured data in a storage apparatus of a computer;

a system for seeking a maximum and minimum value of $S1_{(m, n)}$ and $S2_{(m, n)}$ for all coordinate points and calculating the difference thereof, and setting the obtained values as difference H1(0.0, 0.0) and difference H2(0.0, 0.0), respectively, when the measured value is not manipulated in any way; and a system for subsequently fixing end A of the virtual plane ABCD and respectively moving end B and end C vertically at a prescribed deflection width B, C regarding a predetermined maximum deflection width and pitch in the Z axis direction so as to tilt the virtual plane ABCD against the surface plate on the computer, calculating the respective distances or heights $S1_{(m, n)}$(B, C), $S2_{(m, n)}$(B, C) from all coordinate points $(X_m, Y_n)$ on the virtual plane ABCD to the upper surface and the lower surface on the planar material of the coordinate points corresponding to the planar material each time the tilt is changed, and seeking the maximum and minimum value of $S1_{(m, n)}$(B, C), $S2_{(m, n)}$(B, C) and calculating the differences H1(B, C) and H2(B, C) thereof, and repeating the calculation for all predetermined B and C combinations;

wherein the virtual plane ABCD with the smallest total value of H1(B, C) and H2(B, C) calculated in all B and C combinations is determined to be a plane that is parallel to a plane of minimum machining cost.

14. The device of determining a work surface of a planar material according to claim 13, wherein a distance or height $S1_{(m, n)}$ between a virtual plane ABCD that is parallel to a surface plate positioned at Z=h, which is higher than the upper surface of the planar material, and the upper surface of the planar material and a distance or height $S2_{(m, n)}$ between a virtual plane ABCD' that is parallel to a surface plate positioned at Z=I, which is lower than the lower surface of the planar material, and the lower surface of the planar material are measured so as to obtain a thickness $T_{(m, n)}$ of the planar material calculated from $T_{(m, n)}$=h−I−$S1_{(m, n)}$−$S2_{(m, n)}$.

15. The device of determining a work surface of a planar material according to claim 12, wherein, upon reversing the planar material and mounting it on a surface plate of a processing machine, a point on a plane facing the virtual plane ABCD of the planar material corresponding to the coordinate points in which a value $\{Z_{(m, n)} - \frac{1}{2} T_{(m, n)}\}$ obtained by deducting ½ of the thickness $T_{(m, n)}$ of the planar material at the coordinate points $(X_m, Y_n)$ from the distance or height $Z_{(m, n)}$ up to the planar material among the coordinate points $(X_m, Y_n)$ of the virtual plane ABCD that is parallel to the minimum machining cost becomes the smallest value $\{Z_{(m, n)} - \frac{1}{2} T_{(m, n)}\}_{min}$ is set as a point for coming in contact with the surface plate.

16. The device of determining a work surface of a planar material according to claim 12, wherein, upon reversing the planar material and mounting it on a surface plate of a processing machine, a value sought by deducting a value $\{Z_{(m, n)} - \frac{1}{2} T_{(m, n)}\}$, which is obtained by subtracting ½ of the thickness $T_{(m, n)}$ of the planar material at the coordinate points $(X_m, Y_n)$ from the distance or height $Z_{(m, n)}$ up to the planar material among the coordinate points $(X_m, Y_n)$ of the virtual plane ABCD becomes the smallest value $\{Z_{(m, n)} - \frac{1}{2} T_{(m, n)}\}_{min}$, from the measured value of the distance or height of four corners of a plane facing the virtual plane ABCD of the planar material is set as the thickness of a spacer to be inserted into the four corners upon mounting the planar material on the processing machine.

17. The device of determining a work surface of a planar material according to claim 12, further comprising machining equipment for performing cutting work, grinding process, and electrical discharging in order to cut out a plate having a uniform thickness from a planar material.

18. The device of determining a work surface of a planar material according to claim 12, further comprising a device for grinding one surface of the planar material, subsequently reversing the planar material and mounting it on a surface plate, and processing the rear surface.

19. The device of determining a work surface of a planar material according to claim 12, further comprising a device for measuring the distance or height of the Z direction at positions in intervals of 20 mm or less in both the X direction and Y direction of the coordinate axis of the planar material.

20. The device of determining a work surface of a planar material according to claim 12, further comprising a device for measuring the distance or height from the planar material with a laser distance sensor or a contact distance sensor.

21. The device of determining a work surface of a planar material according to claim 12, further comprising a device for adjusting the tilt of a biaxial tilt machining table of an NC-controllable processing machine in order to set the work surface of the planar material to a prescribed position in relation to the surface plate based on the data.

* * * * *